United States Patent
Suzuki et al.

(10) Patent No.: US 7,274,152 B2
(45) Date of Patent: Sep. 25, 2007

(54) RARE GAS FLUORESCENT LAMP LIGHTING APPARATUS

(75) Inventors: Shinichi Suzuki, Fukuroi (JP); Ryu Terada, Fukuroi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/195,746

(22) Filed: Aug. 3, 2005

(65) Prior Publication Data
US 2006/0055342 A1    Mar. 16, 2006

(30) Foreign Application Priority Data
Sep. 10, 2004    (JP)    ............. 2004-264191

(51) Int. Cl.
*H05B 37/02*    (2006.01)
(52) U.S. Cl. ..................... 315/219; 315/291
(58) Field of Classification Search ............ 315/209 R, 315/224–226, 291, 307, 219, DIG. 5, DIG. 7
See application file for complete search history.

(56) References Cited
U.S. PATENT DOCUMENTS
6,225,751 B1 * 5/2001 Komatsu ................ 315/209 R
6,548,966 B2 * 4/2003 Kawasaka et al. .......... 315/291

FOREIGN PATENT DOCUMENTS
JP    A 2001-15284    1/2001

* cited by examiner

*Primary Examiner*—Thuy Vinh Tran
(74) *Attorney, Agent, or Firm*—Oliff & Berridge, PLC

(57) ABSTRACT

There is provided a rare gas fluorescent lamp lighting apparatus including: an input power source; a transformer having a rare gas fluorescent lamp connected to the secondary side thereof; a switching element connected in series to the primary side of the transformer; and a drive block to drive the switching element. The drive block includes: a constant voltage circuit to convert the voltage of the input power source into a constant voltage as an output; a constant current circuit to output a charging current according to the voltage of the input power source; a triangular waveform oscillation circuit to increase and decrease oscillation frequency according respectively to an increase and a decrease in a voltage of the input power source; and a comparison circuit to transform a triangular waveform outputted from the triangular waveform oscillation circuit into a rectangular waveform with a predetermined duty ratio as an output.

3 Claims, 24 Drawing Sheets

FIG. 3A COMP1o
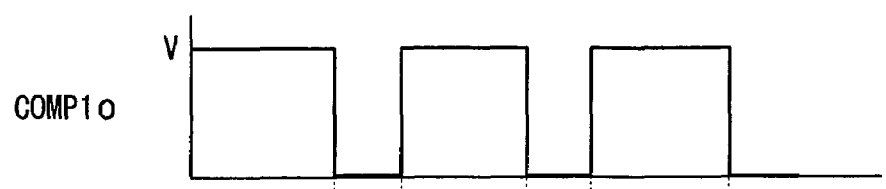
FIG. 3B COMP(+)
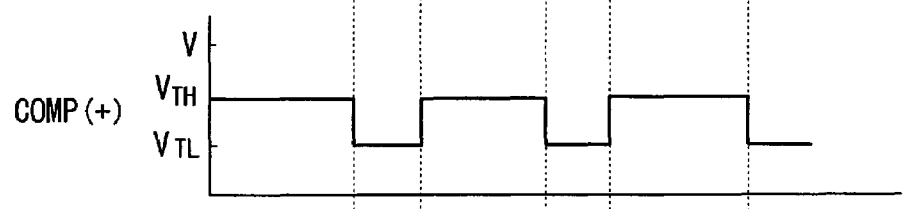
FIG. 3C COMP(-)
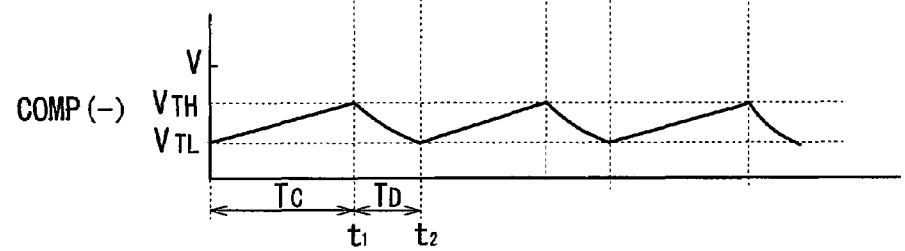

FIG. 5
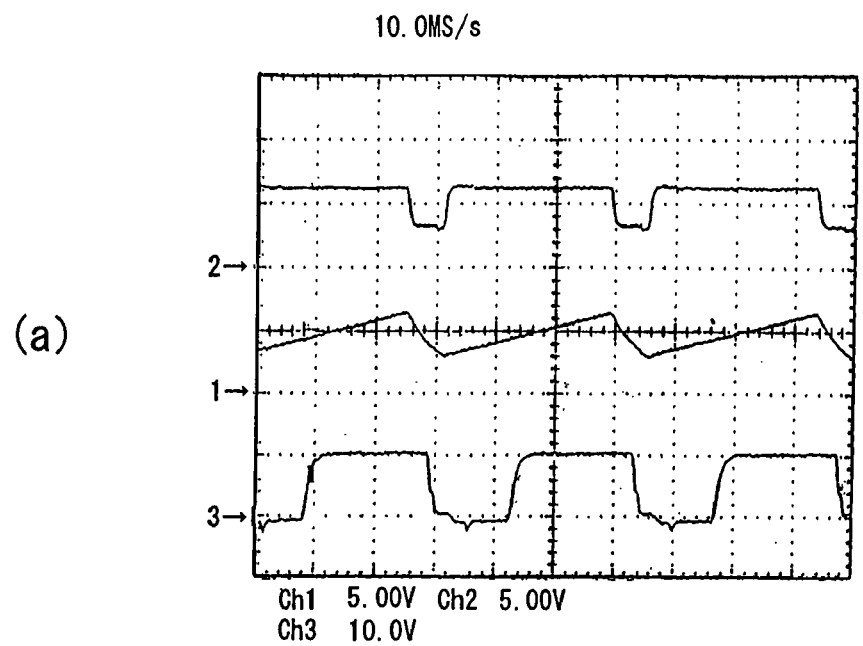
(a)
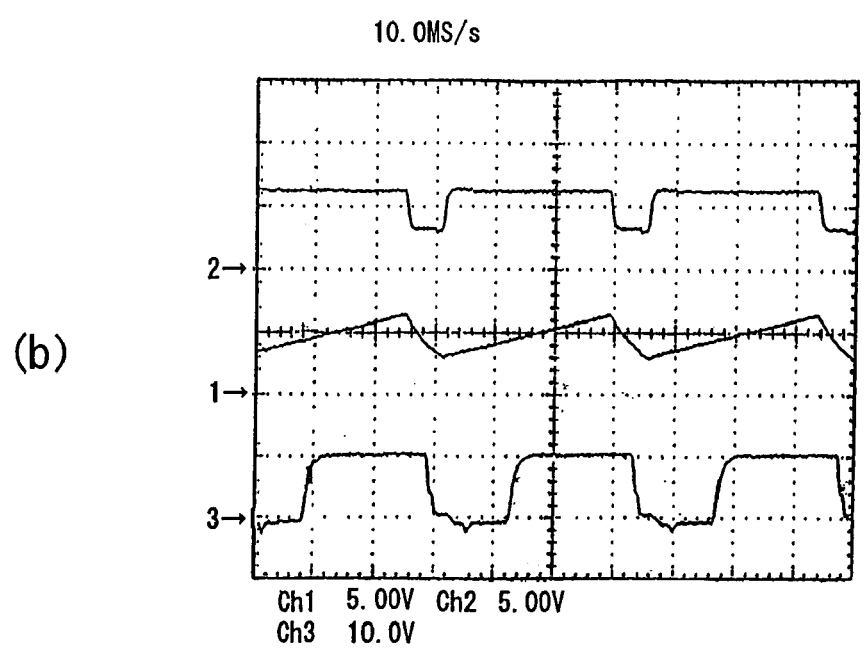
(b)

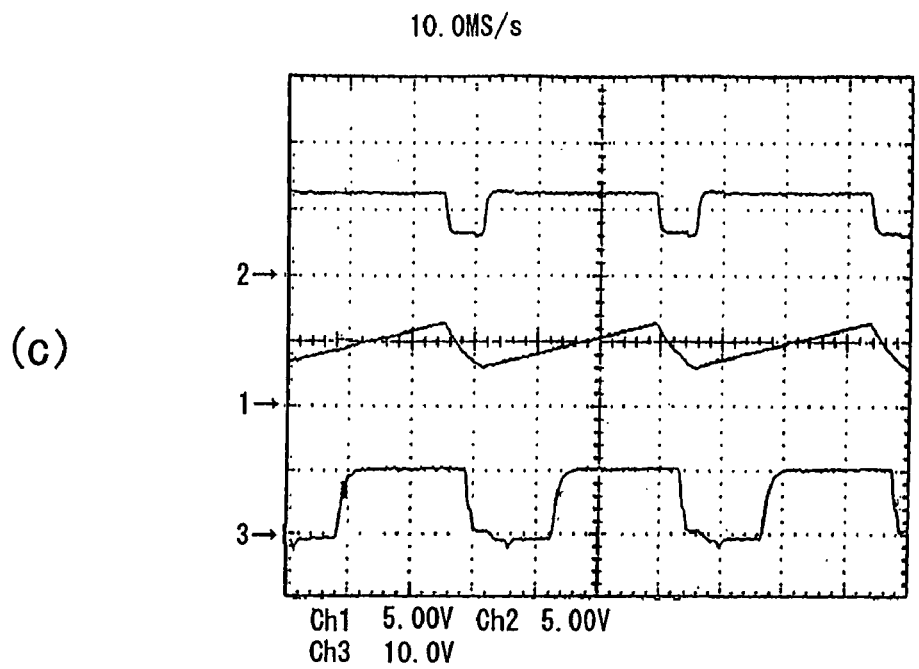
FIG. 6
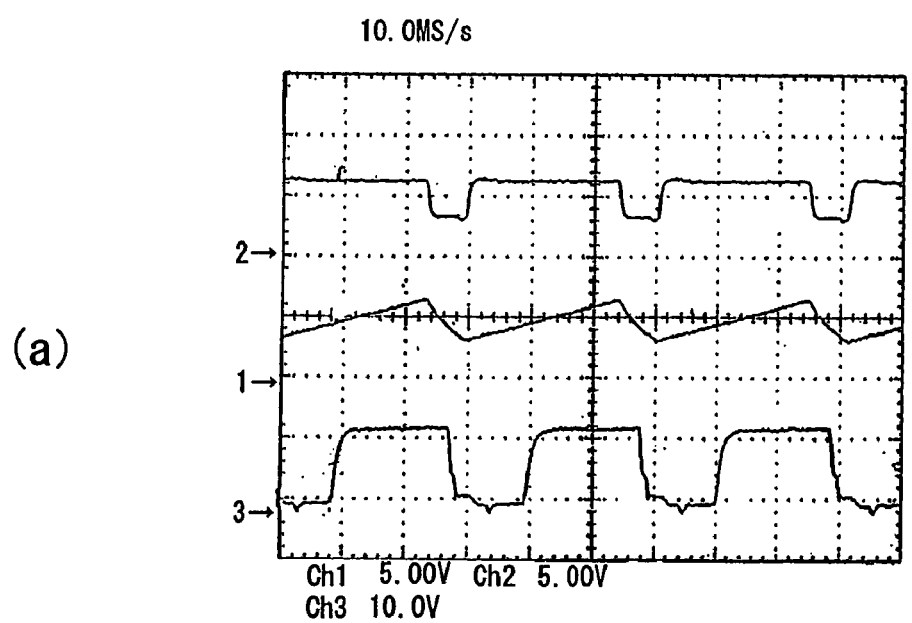

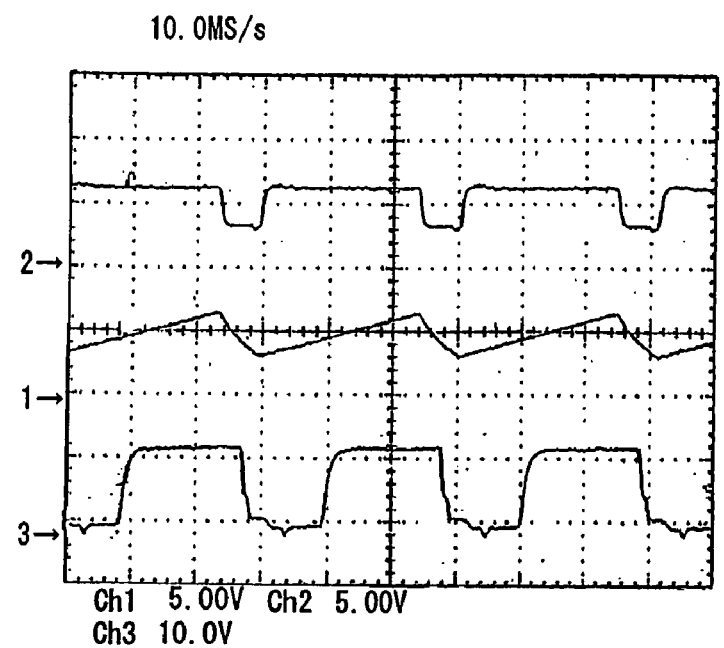
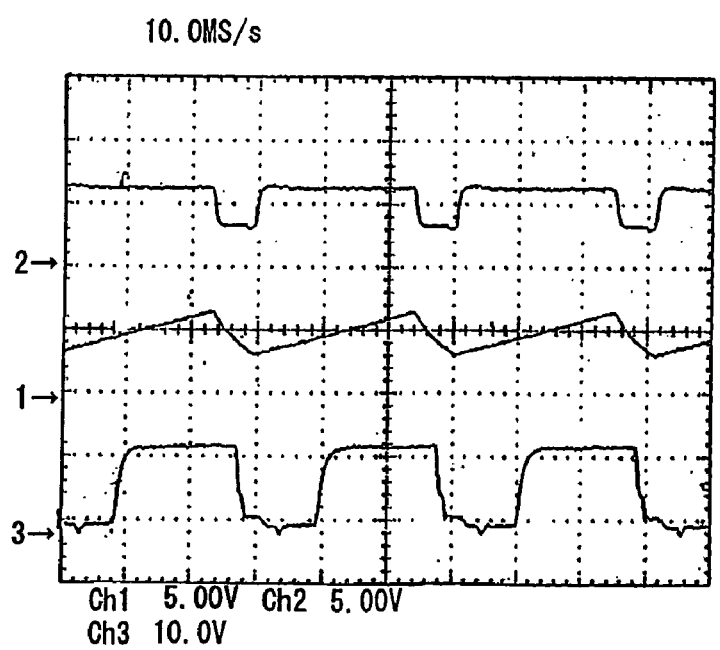

FIG. 7
(a)
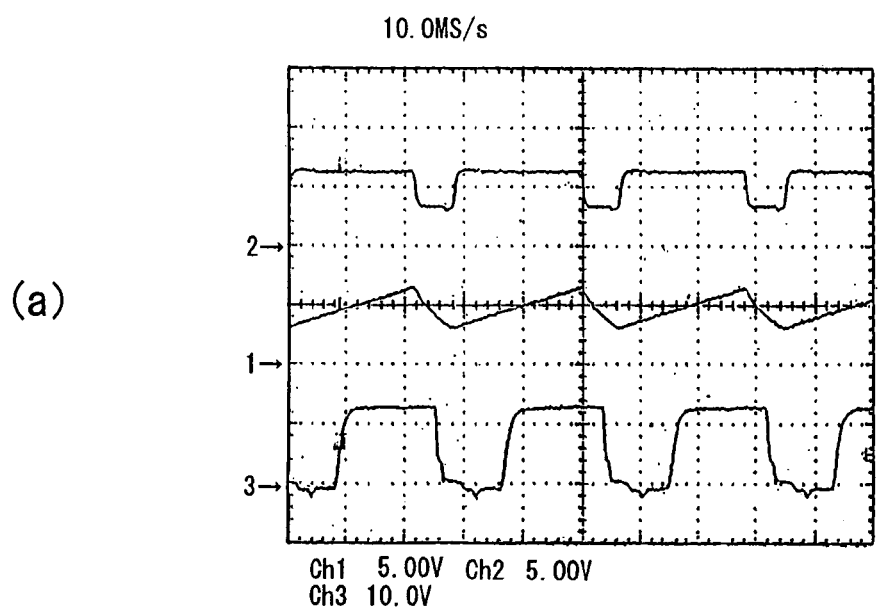
(b)
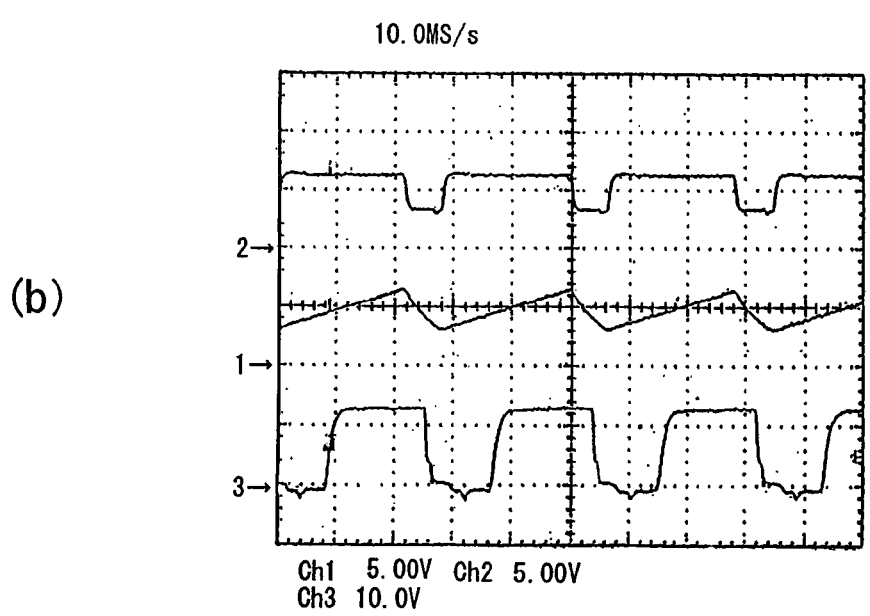

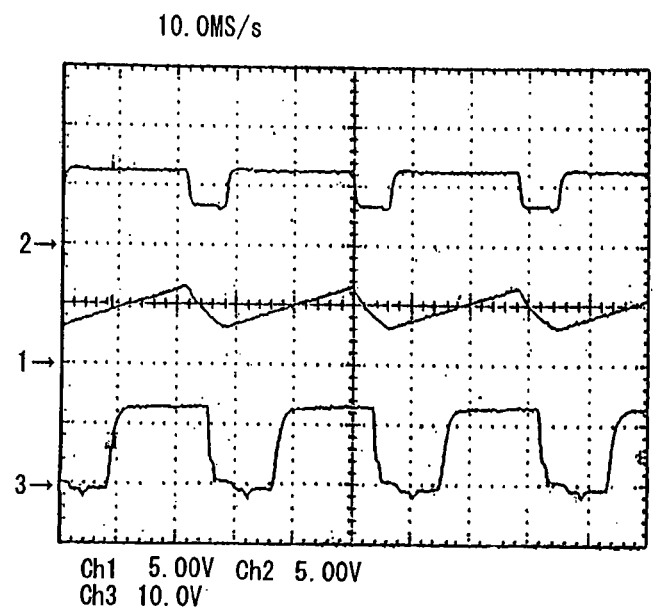
(c)
FIG. 8
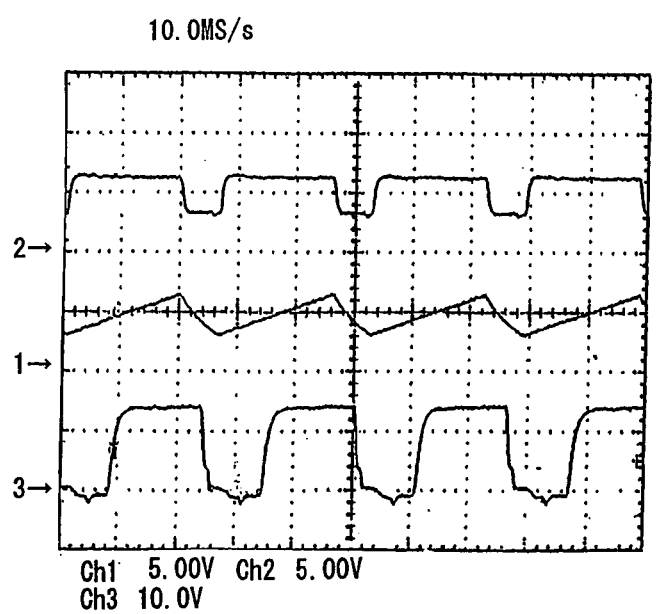
(a)

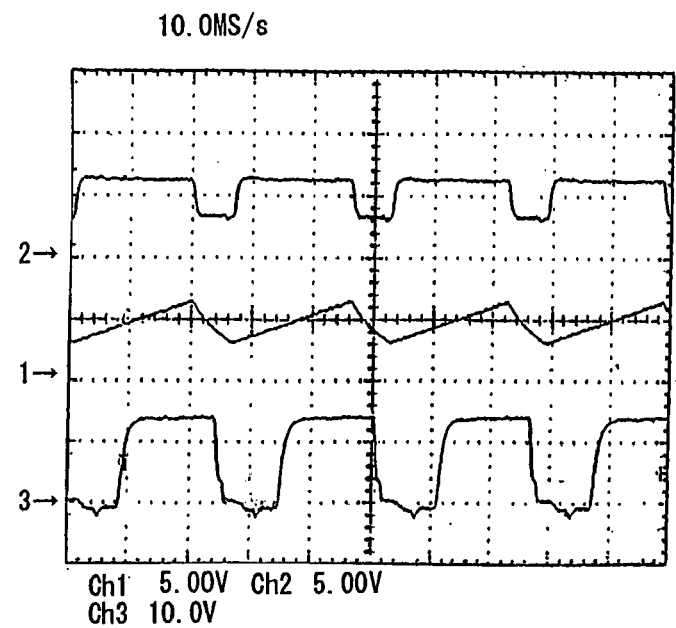
(b)
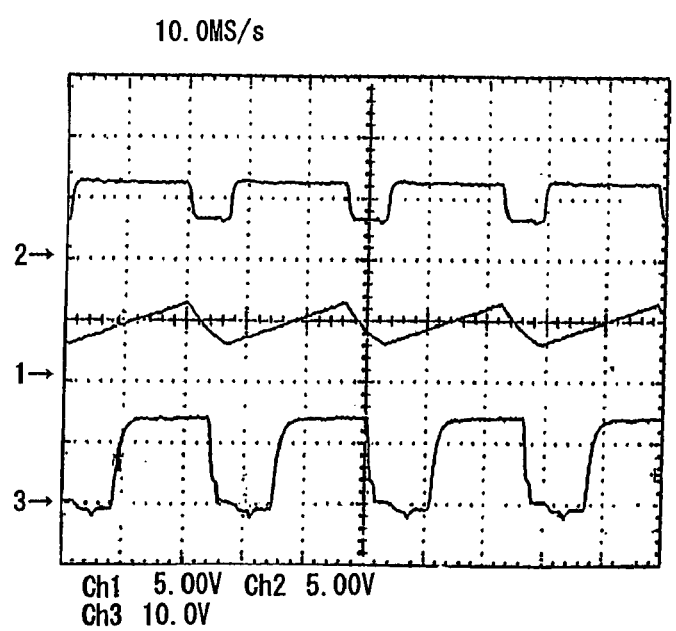
(c)

FIG. 9
(a)
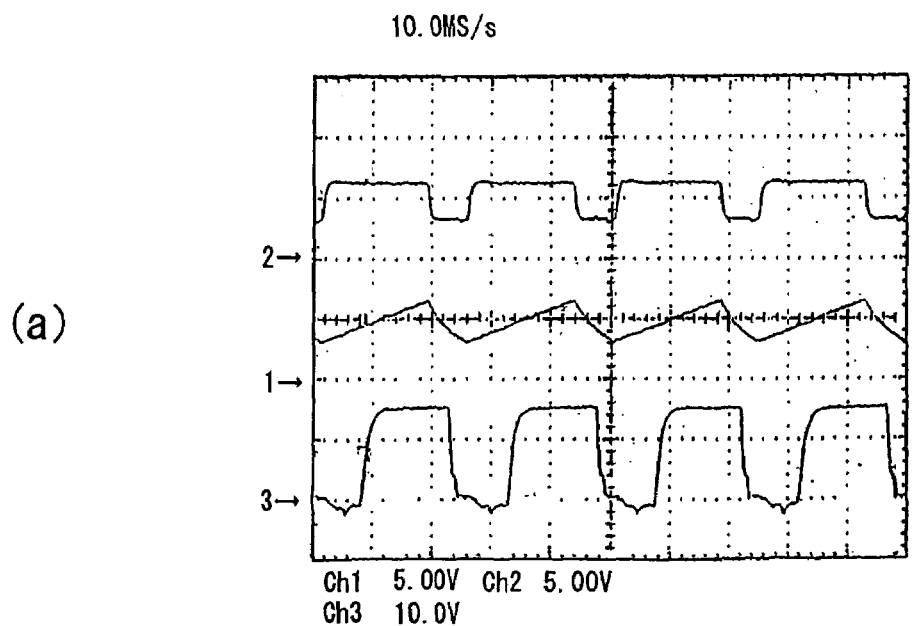
(b)
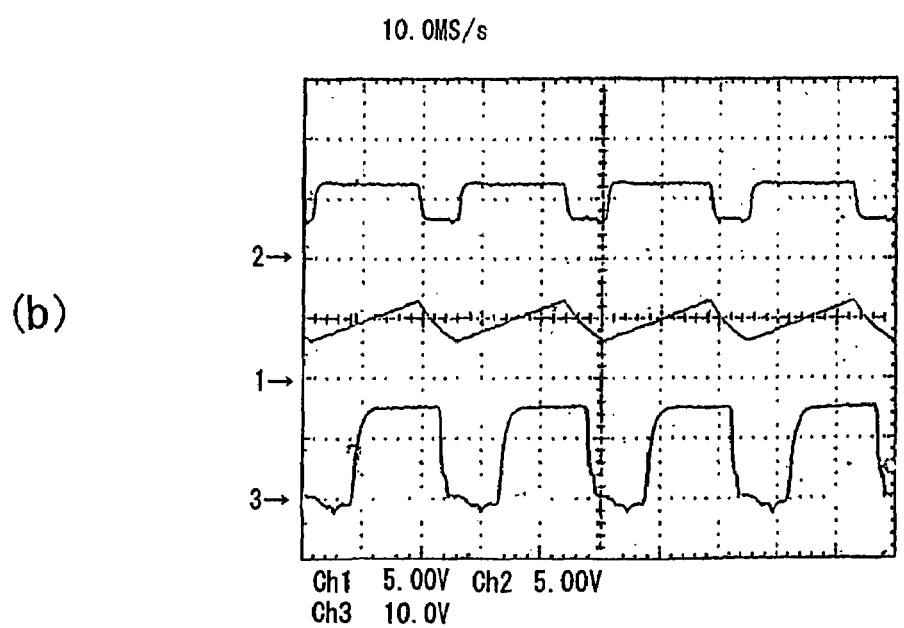

(c) 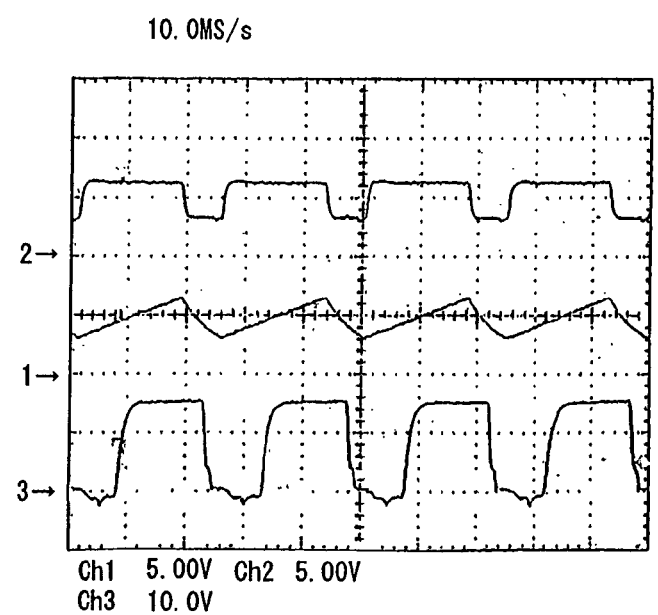

FIG. 11
(a)
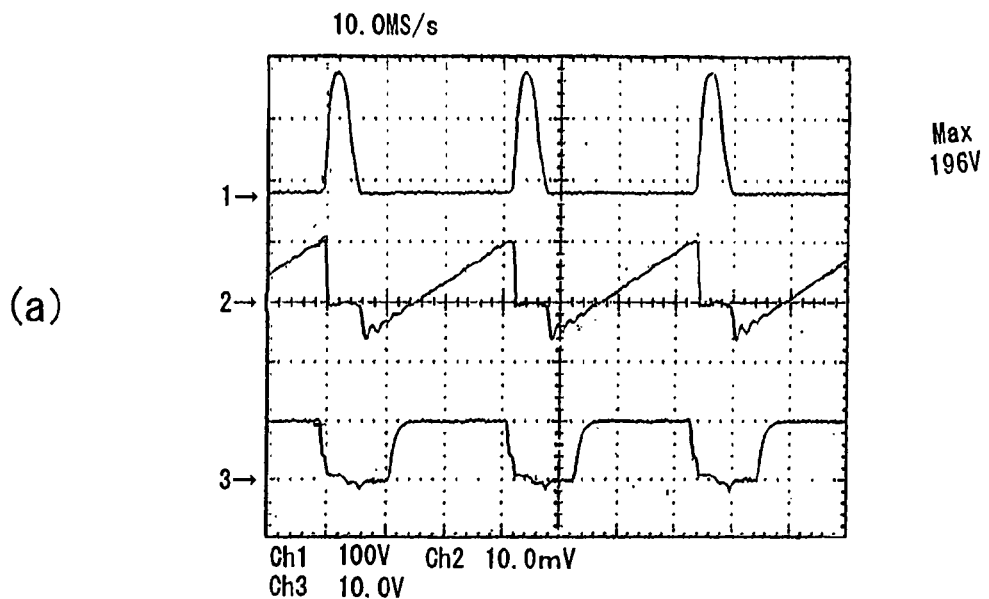
(b)
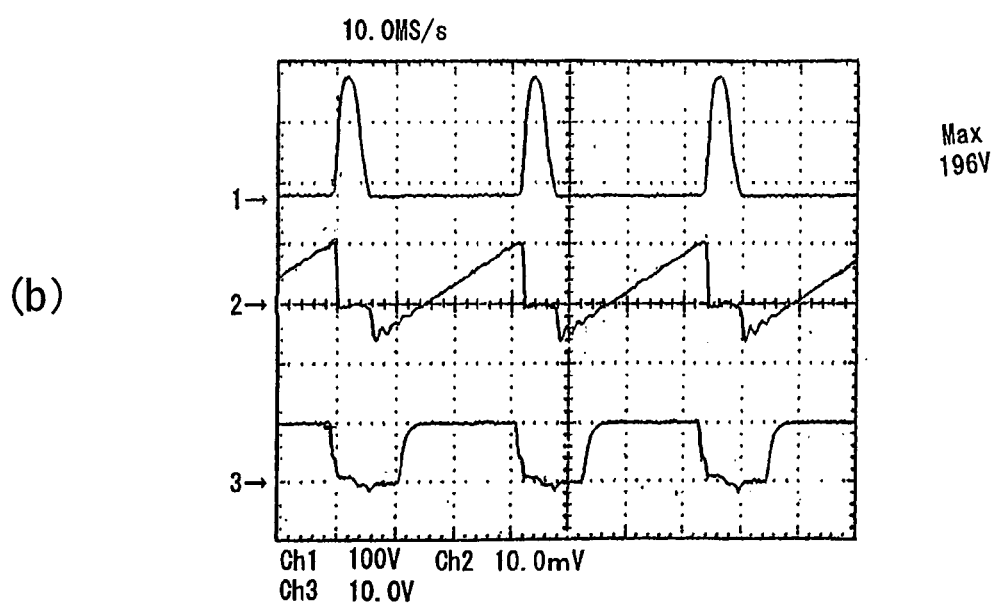

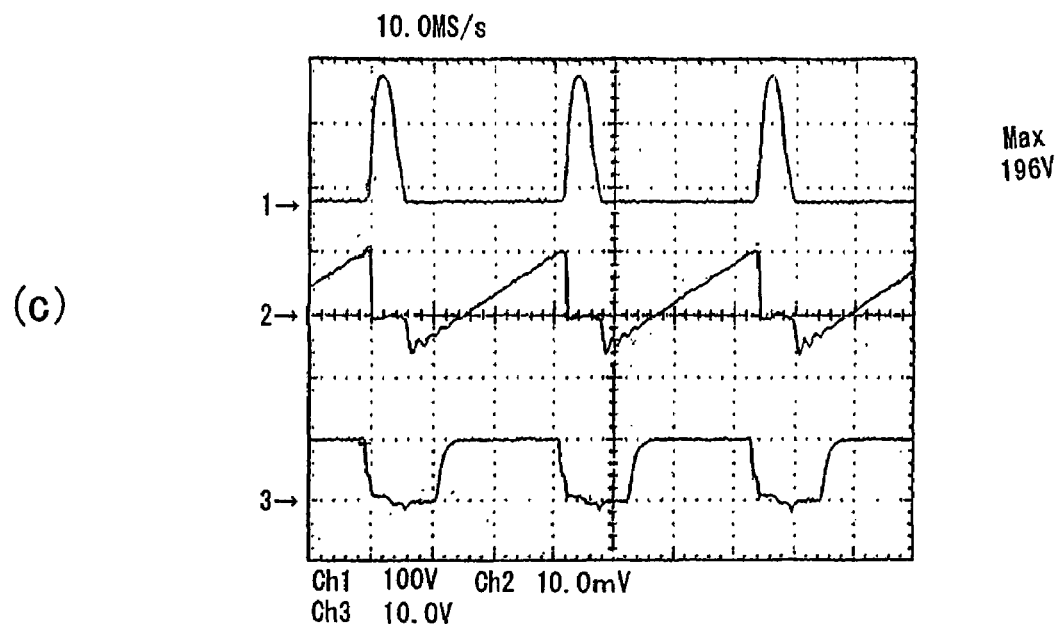
(c)
FIG. 12
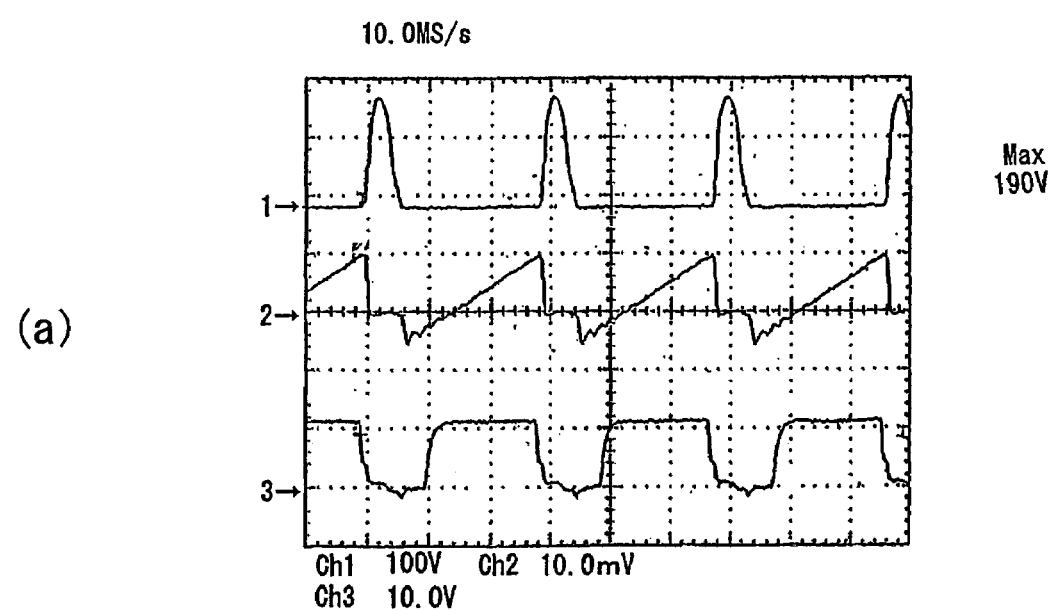
(a)

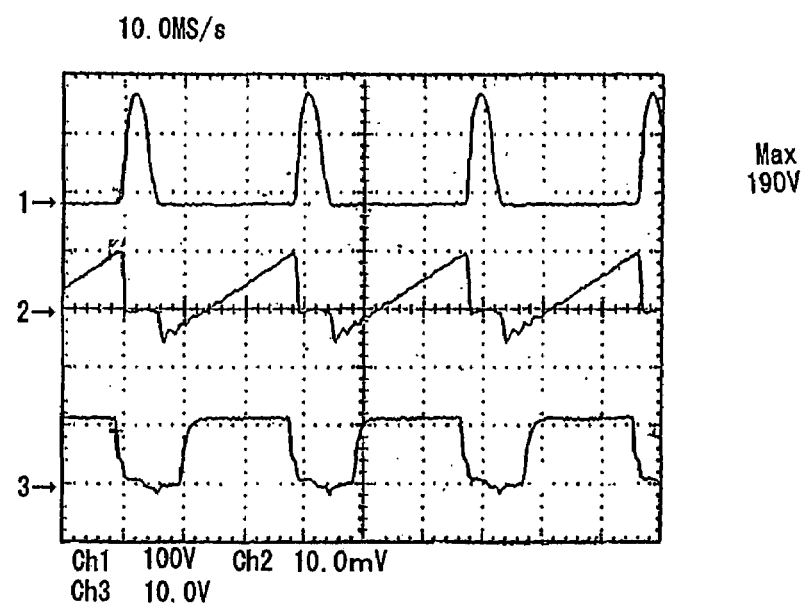
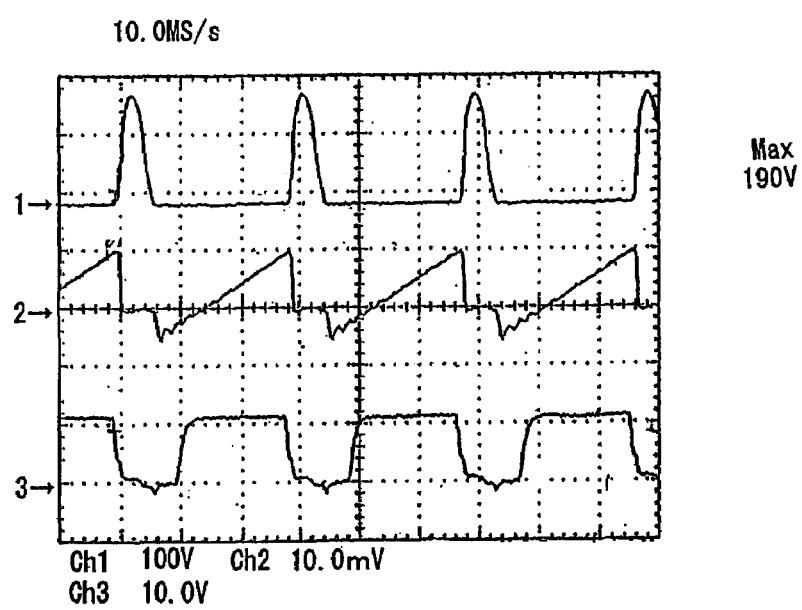

FIG. 13
(a) 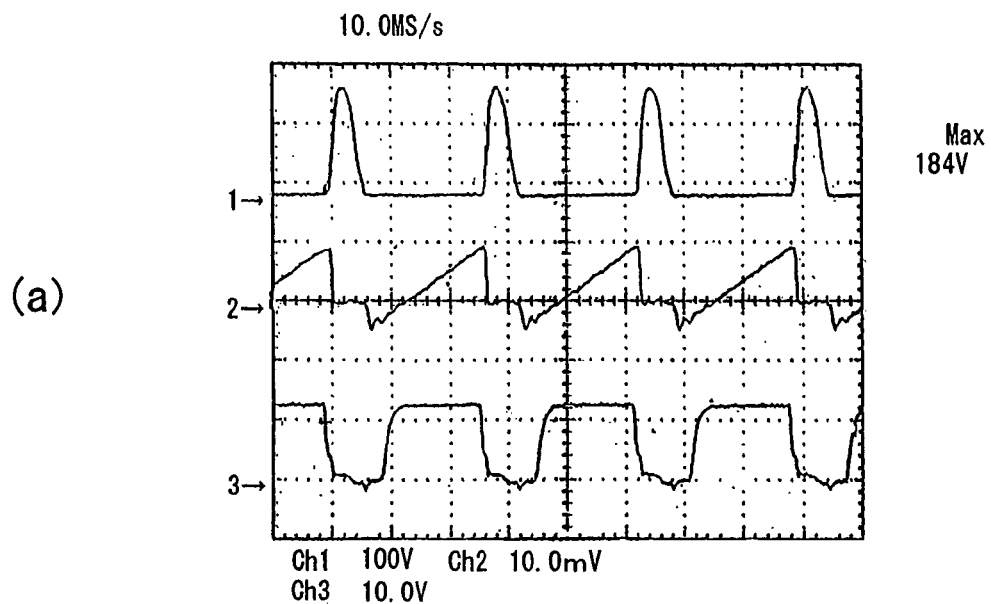
(b) 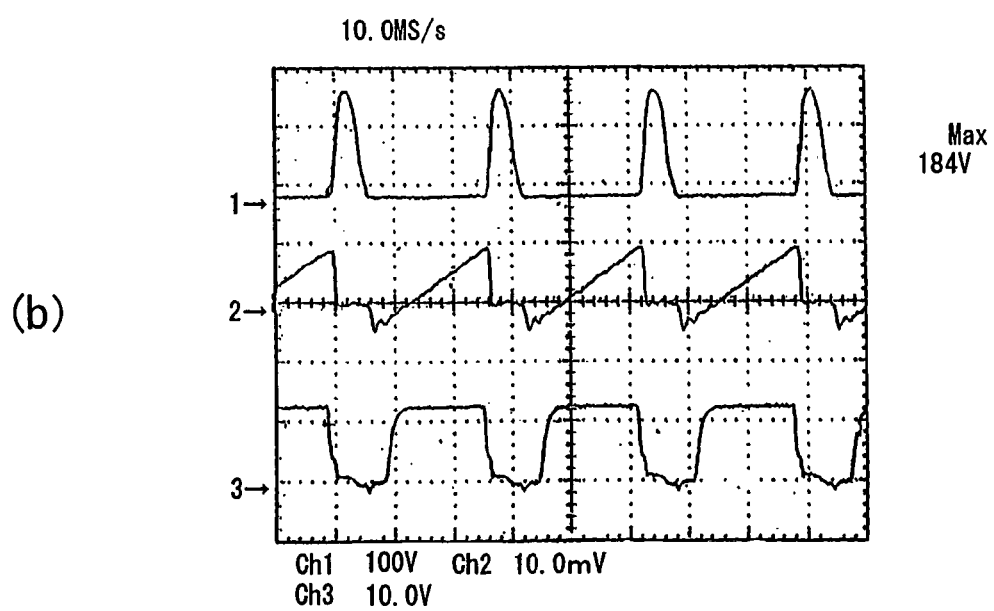

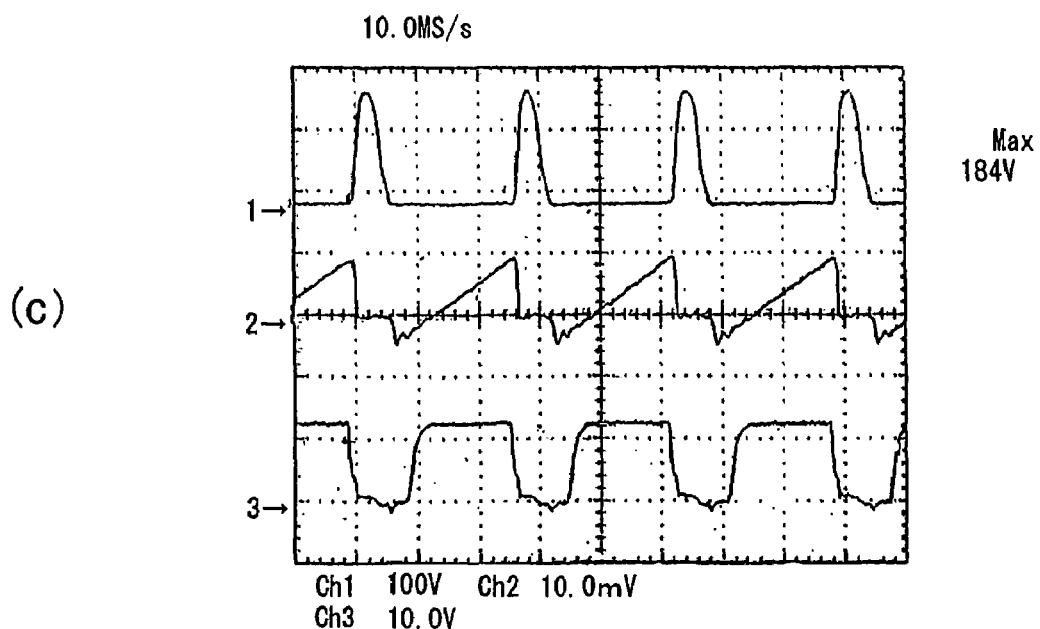
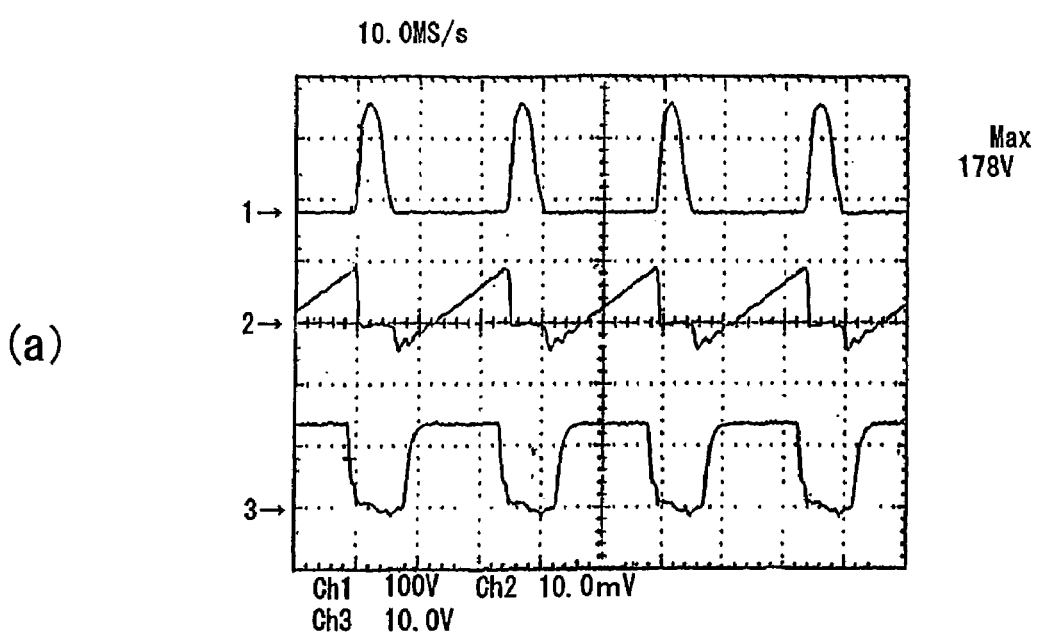
FIG. 14

(b) 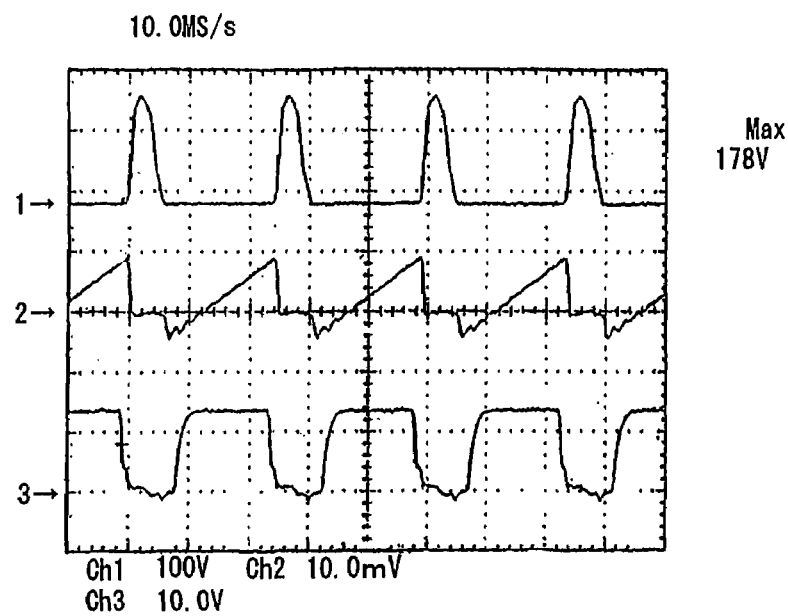
(c) 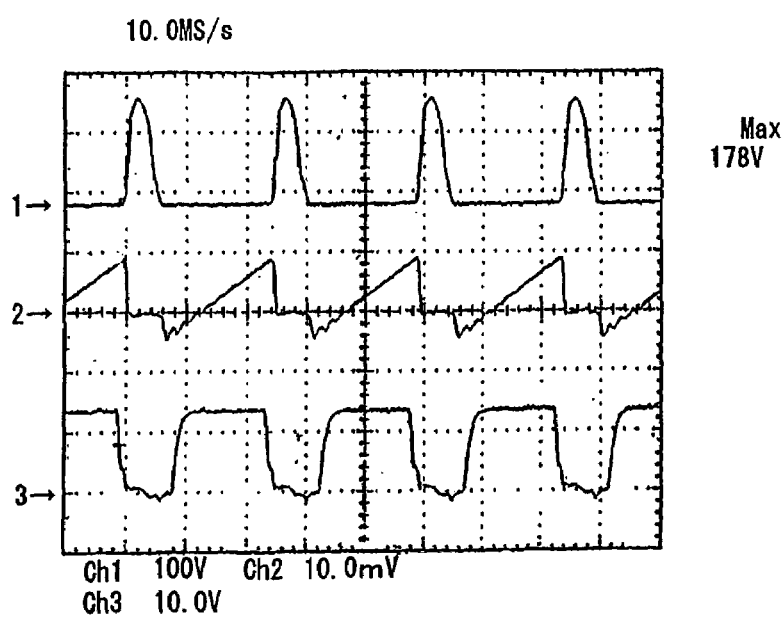

FIG. 15
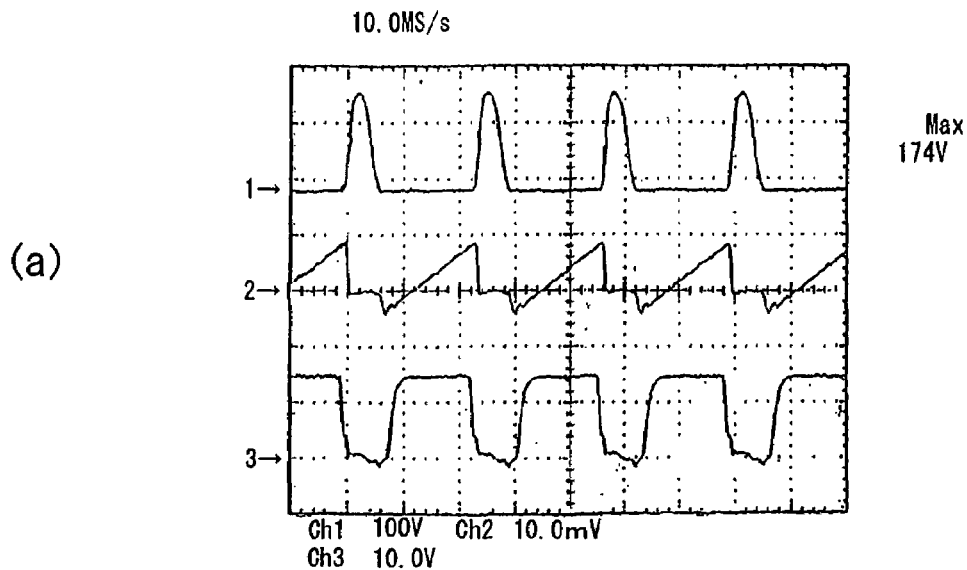
(a)
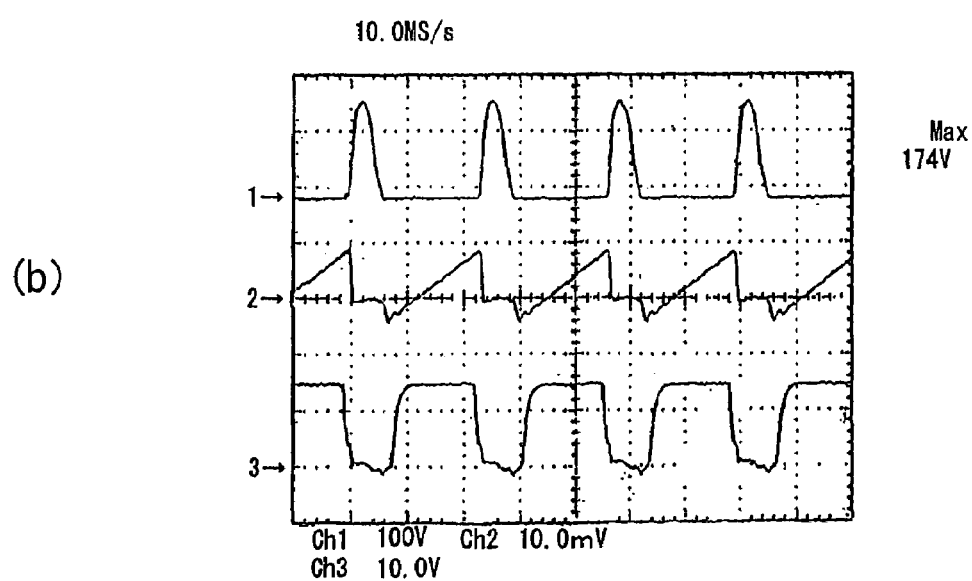
(b)

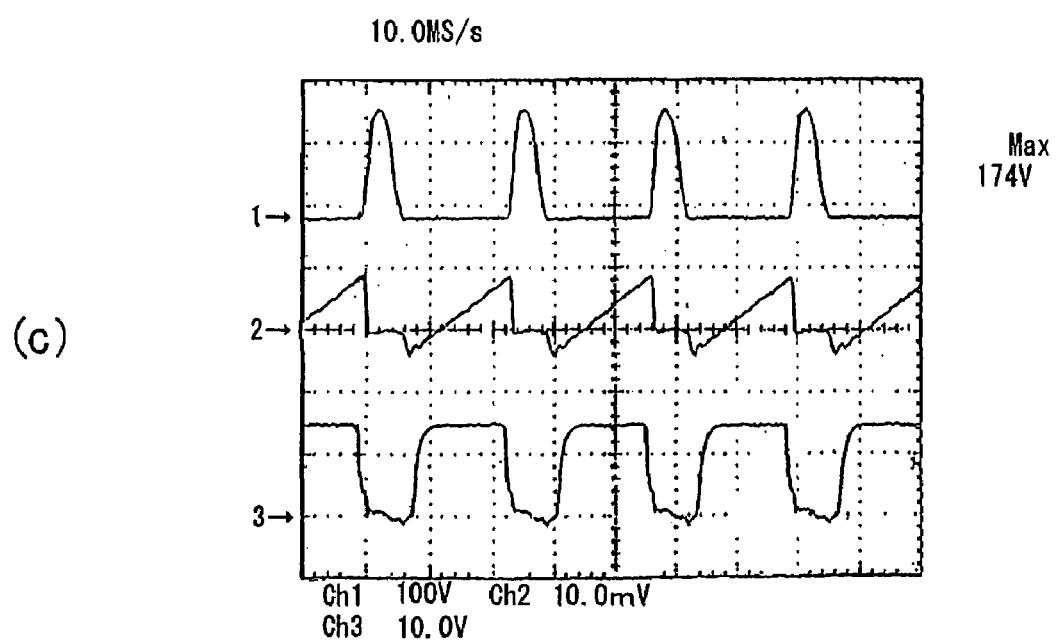

RARE GAS FLUORESCENT LAMP LIGHTING APPARATUS

BACKGROUND OF THE INVENTION

1. Field of the Invention

The present invention relates to a rare gas fluorescent lamp lighting apparatus, and more particularly to a rare gas fluorescent lighting apparatus to light a rare gas fluorescent lamp as a light source in a document reading device, such as a facsimile machine, an image scanner, and a copying machine.

2. Description of the Related Art

Recently, a rare gas fluorescent lamp, which emits light through rare gas discharging, is increasingly used as a light source for illumination in a document reading device, such as a copying machine, and an image scanner. It is well known that a rare gas fluorescent lamp is lighted with a high-intensity luminance when a high-frequency pulse voltage is applied, and a lighting apparatus with an inverter circuit to generate such a high-frequency pulse voltage is preferably employed for lighting a rare gas fluorescent lamp.

On the other hand, there is a problem with a rare gas fluorescent lamp that when a lamp current is varied due to the fluctuation of an input voltage, or the like during the operation of the aforementioned document reading device, the light amount of a lamp is varied thereby deteriorating accuracy of reading a document, which results in impairing image reproduction quality. In order to deal with this problem, a rare gas fluorescent lamp lighting apparatus is proposed, in which a DC-DC converter is put at the input side of the circuit to generate a high-frequency voltage thereby stabilizing electric power at the input side so that the light mount of a rare gas fluorescent lamp is stabilized without suffering the influence of the fluctuation of the input voltage (refer to, for example, Japanese Patent Application Laid-Open No. 2001-15284).

FIG. 18 is a block diagram of such a rare gas fluorescent lamp lighting apparatus as disclosed in the aforementioned Japanese Patent Application Laid-Open No. 2001-15284, in which a step-up DC-DC converter CV is provided at the input side of a high-frequency voltage generating circuit HC. A second driving circuit CT in the DC-DC converter CV is adapted to feed a PWM modulated driving signal to a second switching element S2 based on a signal fed back from a current detecting circuit R so that a current detected at the current detecting circuit R has a constant peak value, whereby the output is controlled at a constant electric power without receiving the influence of voltage fluctuation of a DC power supply E1 thus stabilizing the light amount of a rare gas fluorescent lamp DL.

The rare gas fluorescent lamp lighting apparatus shown in FIG. 18, which includes the step-up DC-DC converter CV disposed at the input side of the high-frequency voltage generating circuit HC as described above, suffers deterioration in efficiency due to the switching loss of the switching element S2, the copper loss and the iron loss of a coil L1, and the loss at a diode D1, and also requires a large space for mounting components thus preventing downsizing of the apparatus. And, the second driving circuit CT is usually constituted as an IC, and therefore the entire cost is pushed up.

SUMMARY OF THE INVENTION

The present invention has been made in light of the above problems and therefore has as an object to provide a rare gas fluorescent lamp lighting apparatus, in which the amount of light is stabilized without suffering the influence of the voltage fluctuation of the input power supply and without deterioration of efficiency, and which is inexpensively fabricated with a smaller dimension.

In order to achieve the object described above, according to an aspect of the present invention, a rare gas fluorescent lamp lighting apparatus is provided, which includes: an input power source; a transformer having a rare gas fluorescent lamp connected to a secondary side thereof; a switching element connected in series to a primary side of the transformer; and a drive block to drive the switching element. The drive block includes: a triangular waveform oscillation circuit to increase and decrease oscillation frequency according respectively to an increase and a decrease in a voltage of the input power source; and a comparison circuit to transform a triangular waveform outputted from the triangular waveform oscillation circuit into a rectangular waveform with a predetermined duty ratio. Since the drive block, which drives the switching element connected to the primary side of the transformer, includes the oscillation circuit adapted to vary the frequency according to the variation of the input voltage, the voltage inputted to the primary side of the transformer can be maintained substantially constant, whereby the light amount of the rare gas fluorescent lamp is stabilized.

In the aspect of the present invention, the drive block may further include: a constant voltage circuit to convert the voltage of the input power source into a constant voltage as an output; and a constant current circuit to output a charging current according to the voltage of the input power source, and the triangular waveform oscillation circuit may include: an oscillator capacitor to be charged by the charging current of the constant current circuit and to be discharged at a predetermined time constant; and a comparator which switches between a charging mode and a discharging mode for the oscillator capacitor, and to which a threshold voltage resulting from division of the constant voltage from the constant voltage circuit, and a terminal-based voltage across both terminals of the oscillator capacitor are inputted, whereby the terminal-based voltage is outputted as a triangular waveform voltage. Since the oscillation circuit is simply structured with the comparator and the capacitor as main components without employing circuit components for electric power control to stabilize the voltage of the input power source, the light amount of the rare gas fluorescent lamp can be stabilized without deterioration in efficiency, thus enabling downsizing and cost reduction.

BRIEF DESCRIPTION OF THE DRAWINGS

FIGS. 3A to 3C are timing charts for an operation sequence of a triangular waveform oscillation circuit in the rare gas fluorescent lamp lighting apparatus of FIG. 1, respectively showing an output voltage, a non-inverting voltage, and an inverting voltage;

FIG. 5 is graphs of waveforms generated at relevant parts of the rare gas fluorescent lamp lighting apparatus of FIG. 1 in case of a voltage of 21.6 V at an input power source, wherein (a) and (b) respectively show a non-inverting input voltage and an inverting input voltage of a comparator of the triangular waveform oscillation circuit, and (c) shows a gate driving voltage of a switching element;

FIG. 6 is graphs of waveforms generated at the relevant parts of the rare gas fluorescent lamp lighting apparatus of FIG. 1 in case of a voltage of 22.8 V at the input power source, wherein (a) and (b) respectively show a non-inverting input voltage and an inverting input voltage of the comparator of the triangular waveform oscillation circuit, and (c) shows a gate driving voltage of the switching element;

FIG. 7 is graphs of waveforms generated at the relevant parts of the rare gas fluorescent lamp lighting apparatus of FIG. 1 in case of a voltage of 24.0 V at the input power source, wherein (a) and (b) respectively show a non-inverting input voltage and an inverting input voltage of the comparator of the triangular waveform oscillation circuit, and (c) shows a gate driving voltage of the switching element;

FIG. 8 is graphs of waveforms generated at the relevant parts of the rare gas fluorescent lamp lighting apparatus of FIG. 1 in case of a voltage of 25.2 V at the input power source, wherein (a) and (b) respectively show a non-inverting input voltage and an inverting input voltage of the comparator of the triangular waveform oscillation circuit, and (c) shows a gate driving voltage of the switching element;

FIG. 9 is graphs of waveforms generated at the relevant parts of the rare gas fluorescent lamp lighting apparatus of FIG. 1 in case of a voltage of 26.4 V at the input power source, wherein (a) and (b) respectively show a non-inverting input voltage and an inverting input voltage of the comparator of the triangular waveform oscillation circuit, and (c) shows a gate driving voltage of the switching element;

FIG. 11 is graphs of waveforms generated at relevant parts of the rare gas fluorescent lamp lighting apparatus of FIG. 1 in case of a voltage of 21.6 V at an input power source, wherein (a) shows a voltage generated at the primary side of a transformer when the switching element is off, (b) shows a current flowing through the transformer, and (c) shows a gate driving voltage of the switching element;

FIG. 12 is graphs of waveforms generated at the relevant parts of the rare gas fluorescent lamp lighting apparatus of FIG. 1 in case of a voltage of 22.8 V at the input power source, wherein (a) shows a voltage generated at the primary side of the transformer when the switching element is off, (b) shows a current flowing through the transformer, and (c) shows a gate driving voltage of the switching element;

FIG. 13 is graphs of waveforms generated at the relevant parts of the rare gas fluorescent lamp lighting apparatus of FIG. 1 in case of a voltage of 24.0 V at the input power source, wherein (a) shows a voltage generated at the primary side of the transformer when the switching element is off, (b) shows a current flowing through the transformer, and (c) shows a gate driving voltage of the switching element;

FIG. 14 is graphs of waveforms generated at the relevant parts of the rare gas fluorescent lamp lighting apparatus of FIG. 1 in case of a voltage of 25.2 V at the input power source, wherein (a) shows a voltage generated at the primary side of the transformer when the switching element is off, (b) shows a current flowing through the transformer, and (c) shows a gate driving voltage of the switching element;

FIG. 15 is graphs of waveforms generated at the relevant parts of the rare gas fluorescent lamp lighting apparatus of FIG. 1 in case of a voltage of 26.4 V at the input power source, wherein (a) shows a voltage generated at the primary side of the transformer when the switching element is off, (b) shows a current flowing through the transformer, and (c) shows a gate driving voltage of the switching element;

DETAILED DESCRIPTION OF THE PREFERRED EMBODIMENT

A preferred embodiment of the present invention will hereinafter be described with reference to the accompanying drawings.

Figure 1:
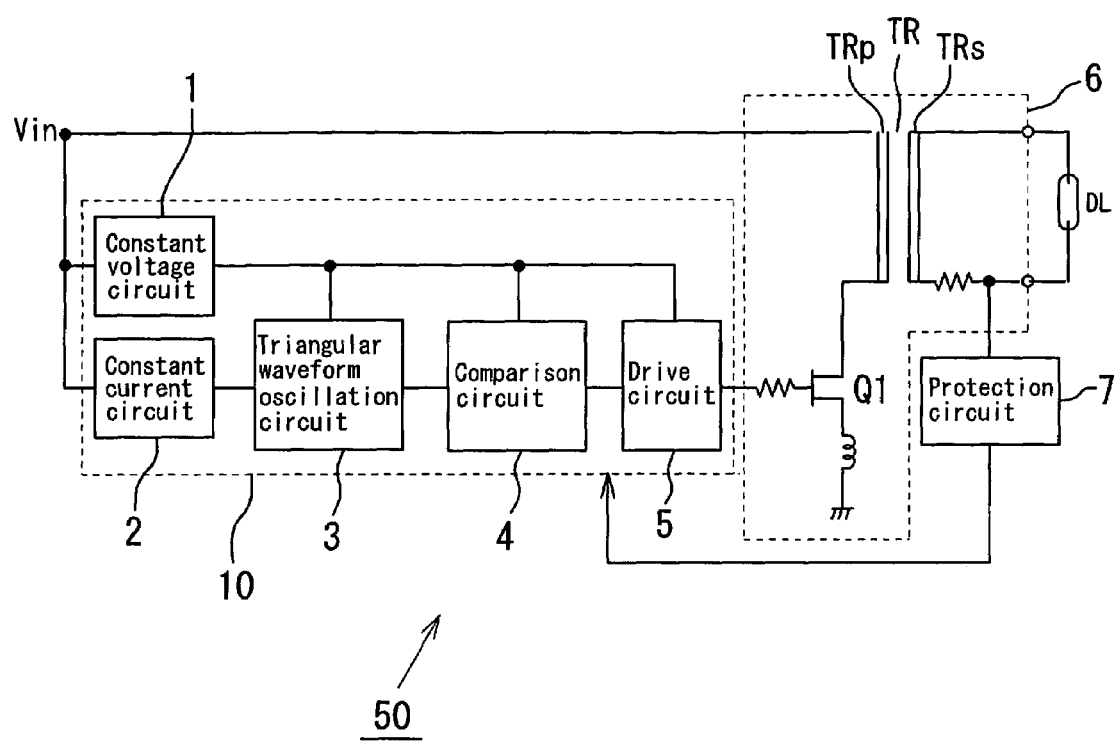
FIG. 1 is a block diagram of a rare gas fluorescent lamp lighting apparatus according to an embodiment of the present invention.

Referring to FIG. 1, a rare gas fluorescent lamp lighting apparatus 50 according the embodiment of the present invention generally includes an inverter circuit 6 connected to an input power source Vin, a drive block 10 to drive the inverter circuit 6, and a protection circuit 7 provided between the inverter circuit 6 and the drive block 10. A rare gas fluorescent lamp DL containing a rare gas consisting mainly of, for example, xenon (Xe) is connected to the output side of the inverter circuit 6. The inverter circuit 6 includes a transformer TR and a switching element Q1 connected in series to the primary side TRp of the transformer TR, and the switching element Q1 is constituted by, for example, an n-channel MOSFET. The drive block 10 includes a constant voltage circuit 1 and a constant current circuit 2, which are connected to the input power source Vin, and further includes a triangular waveform oscillation circuit 3, a comparison circuit 4, and a drive circuit 5, which receive a voltage from the constant voltage circuit 1, and the output of the constant current circuit 2 is connected to the triangular waveform oscillation circuit 3. The output of the drive circuit 5 is connected to the switching element Q1.

Figure 2:
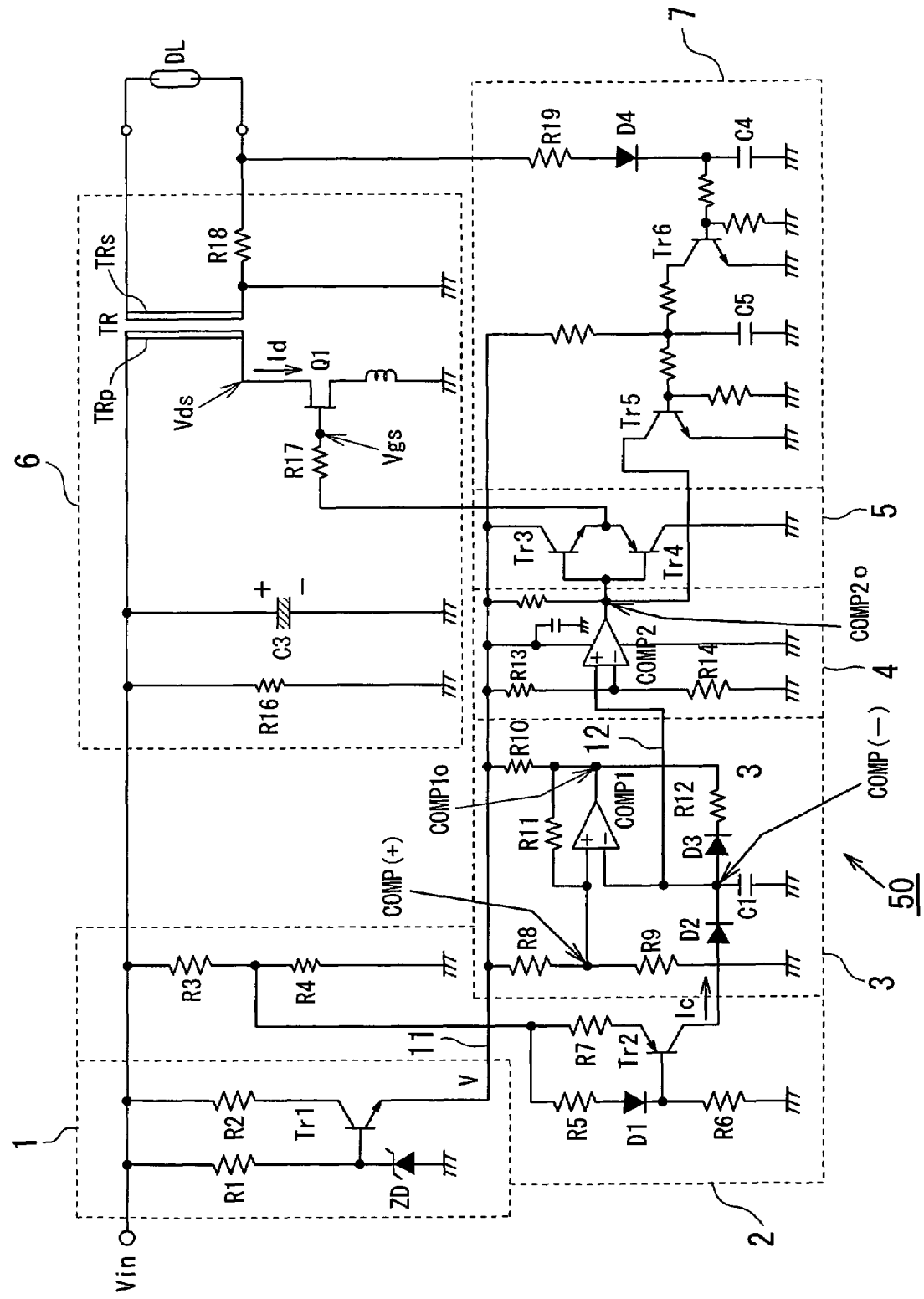
FIG. 2 is a circuitry of the rare gas fluorescent lamp lighting apparatus of FIG. 1.

Referring to FIG. 2, the structures and operations of the circuits in the rare gas fluorescent lamp lighting apparatus 50 will be discussed.

The constant voltage circuit 1 includes resistors R1 and R2, a zener diode ZD, and a transistor Tr1. The connection portion of the resistor R1 and the zener diode ZD is connected to the base terminal of the transistor Tr1, and a constant voltage V set by a zener voltage of the zener diode ZD is supplied to the triangular waveform oscillation circuit 3, the comparison circuit 4, and the drive circuit 5.

The constant current circuit 2 includes variable resistors R3, R4, R5, R6 and R7, a diode D1, and a transistor Tr2. The connection portion of the resistor R6 and the diode D1 is connected to the base terminal of the transistor Tr2, and a charging current Ic set by a voltage of the input power source Vin and resistance values of the variable resistors R3, R4, R5, R6 and R7 is supplied to the triangular waveform oscillation circuit 3. In the constant current circuit 2, the variable resistors R3, R4, R5, R6 and R7 are set at respective predetermined values thereby supplying a constant current independent of a variation of a load connected to the collector terminal of the transistor Tr2, but when the voltage of the input power source Vin undergoes a variation, a voltage applied across both terminals of a series circuit consisting of the resistor R5 and the diode D1 is caused to vary, specifically increase and decrease according respectively to the increase and decrease of the voltage of the input power source Vin, which causes a current value set by the voltage and the resistor R7 to increase and decrease. Thus, the constant current circuit 2 in the present embodiment is adapted to supply to the triangular waveform oscillation circuit 3 the charging current Ic which varies according to the variation of the voltage of the input power source Vin. The constant current 2 may alternatively be constituted by a well known current mirror circuit.

The triangular waveform oscillation circuit 3 includes a comparator COMP1 and an oscillator capacitor C1 as main components. A non-inverting input terminal COMP(+) of the comparator COMP1 is connected to the connection portion of resistors R8 and R9 which constitute a series circuit between an output voltage line 11 of the constant voltage circuit 1 and the ground and is connected also to an output terminal COMP1o of the comparator COMP1 via a feedback resistor R11. The oscillator capacitor C1 has its one terminal connected to the inverting input terminal COMP(−) of the comparator COMP1 and has the other terminal grounded. The one terminal of the oscillator capacitor C1 is also connected to the constant current circuit 2 via a diode 2 and to the output terminal COMP1o of comparator COMP1 via a diode D3 and a resistor R12. The triangular waveform oscillation circuit 3 in the present embodiment is adapted to output to the comparison circuit 4 a triangular waveform voltage generated across both terminals of the oscillator capacitor C1, and the operation of the triangular waveform oscillation circuit 3 will be detailed later.

The comparison circuit 4 includes a comparator COMP2 and resistors R13 and 14. The inverting input terminal of the comparator COMP2 is connected to the connection portion of the resistors R13 and R14 which constitute a series circuit between the output voltage line 11 of the constant voltage circuit 1 and the ground, and the aforementioned triangular waveform voltage as the output from the triangular waveform oscillation circuit 3 is inputted to the non-inverting terminal of the comparator COMP2. The comparison circuit 4 in the present embodiment is adapted to compare the triangular waveform voltage with a threshold voltage resulting from the constant voltage V divided by the resistors R13 and R14, whereby a rectangular waveform voltage having a prescribed duty ratio is generated at an output terminal COMP2o of the comparator COMP2 and outputted to the drive circuit 5.

The drive circuit 5 is a push-pull current amplification circuit including transistors Tr3 and Tr4. The drive circuit 5 is driven by the rectangular waveform voltage from the comparison circuit 4 so as to rapidly charge and discharge a capacitance between the gate and source of the switching element Q1 of the inverter circuit 6, thereby supplying a driving signal Vgs having a high-frequency rectangular waveform to the gate terminal of the switching element Q1.

The inverter circuit 6 includes, as described above, the transformer TR and the switching element Q1 connected in series to the primary side TRp of the transformer TR. The switching element Q1 receives the high-frequency driving signal Vgs supplied from the drive circuit 5 and is thereby turned on and off. When the switching element Q1 is turned on, a current Id, which increases linearly, is caused to flow at the primary side TRp of the transformer TR, and energy is stored at the transformer TR. Then, when the switching element Q1 is turned off, the current Id is cut off, and the energy stored is discharged to the secondary side TRs of the transformer TR, whereby an output voltage is induced at the secondary side TRs of the transformer TR and applied to the rage gas fluorescent lamp DL, and the rare gas fluorescent lamp DL is lighted. During this process, a pulse voltage Vds according to the energy stored in the transformer TR is generated across the drain and source of the switching element Q1.

The protection circuit 7 is adapted to protect circuit elements against stresses generated during no-load discharge at the secondary side TRs of the transformer TR. The protection circuit 7 detects a current flowing at the secondary side TRs of the transformer TR, whereby the drive circuit 5 is deactivated, for example, when the rare gas fluorescent lamp DL is not connected. The operation of the protection circuit 7 will be briefly explained. When the rare gas fluorescent lamp DL is connected, the current flowing at the secondary side TRs of the transformer TR is rectified by a diode D4 so as to charge a capacitor C4 thereby turning on a transistor Tr6, which causes electric charge stored at a capacitor C5 to be discharged, consequently turning off a transistor Tr5. Accordingly, the aforementioned rectangular wave voltage is generated at the output terminal COMP2o of the comparator COMP2 of the comparison circuit 4 connected to the collector terminal of the transistor Tr5, and the drive circuit 5 is duly activated. On the other hand, when the rare gas fluorescent lamp DL is not connected, the capacitor C4 is discharged thereby turning off the transistor Tr6, which causes the capacitor C5 to be charged, consequently turning on the transistor Tr5. Accordingly, the output of the comparator COMP2 of the comparison circuit 4 is fixedly maintained substantially at the ground potential, and the drive circuit 5 is deactivated.

The operations of the triangular waveform oscillation circuit 3 and the comparison circuit 4 will be described with reference to FIGS. 3A to 3C, and FIGS. 4A and 4B. In the description below, the output voltage from the constant voltage circuit 1 is defined as V, and R8=R9=R11=R where R is substantially larger than R10.

Description will first be made, with reference to FIGS. 3A to 3C, on how the triangular waveform oscillation circuit 3 operates when the voltage of the input power source Vin is constant.

Referring to FIG. 3A, it is assumed that an output voltage at the output terminal COMP1o of the comparator COMP1 stays at the high level (i.e., voltage V) during time period $T_C$. Referring to FIG. 3B, a threshold voltage $V_{TH}$ ($V_{TH}$=R/(R+R/2)V≈0.66 V) is inputted to the non-inverting input terminal COMP(+) of the comparator COMP1 during period $T_C$. The oscillator capacitor C1 is charged by the charging current Ic supplied from the constant current circuit 2, and the voltage across both terminals of the oscillator capacitor C1 increases almost linearly during time period $T_C$ as shown in FIG. 3C. This voltage is inputted to the inverting input terminal COMP(−) of the comparator COMP1, and when the input voltage at the inverting terminal COMP(−) increases and reaches the threshold voltage $V_{TH}$ at time point t1, the output voltage at the output terminal COMP1o of the comparator COMP1 is switched to the low level as shown in FIG. 3A.

Referring again to FIG. 3A, the output at the output terminal COMP1o of the comparator COMP1 stays at the low level during time period $T_D$, and a threshold voltage $V_{TL}$ ($V_{TL}$=(R/2)/(R+R/2)V≈0.33 V<$V_{TH}$) is inputted to the non-inverting input terminal COMP(+) of the comparator COMP1 during time period $T_D$ as shown in FIG. 3B. The oscillator capacitor C1 is discharged via the diode D3 and the resistor R12, and consequently the voltage across both terminals of the oscillator capacitor C1 decreases by a time constant determined by the oscillator capacitor C1 and the resistor R12 (the time constant in the present embodiment is adjusted so that the voltage decreases almost linearly as shown in FIG. 3C). This voltage is inputted to the inverting input terminal COMP(−) of the comparator COMP1, and when the input voltage at the inverting input terminal COMP(−) decreases and reaches the threshold voltage $V_{TL}$ at time point t2, the output voltage at the output terminal COMP1o of the comparator COMP1 is switched back to the high level.

The above-described operations during time periods $T_C$ and $T_D$ are repeated, and the triangular waveform voltage shown in FIG. 3C is generated across both terminals of the oscillator capacitor C1. The triangular waveform oscillation circuit 3 in the present embodiment is adapted to output this triangular waveform voltage to the comparison circuit 4.

Figure 4A:
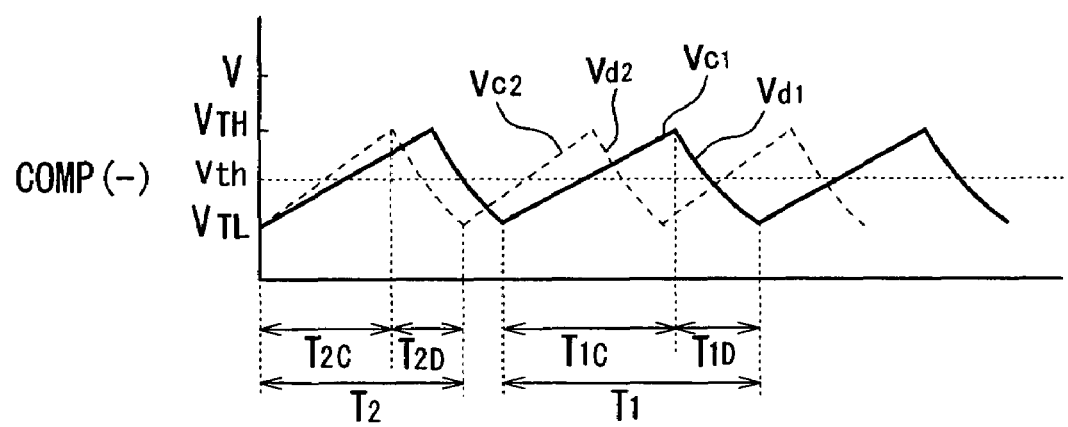
FIG. 4A is a timing chart for the operation sequence of the triangular waveform oscillation circuit.

The impact of variation of the voltage of the input power source Vin on the operation of the triangular waveform oscillation circuit 3 will now be described with reference to FIG. 4A. When the voltage of the input power source Vin increases while the triangular waveform oscillation circuit 3 outputs the triangular waveform voltage having a waveform indicated by a solid line shown in FIG. 4A, the waveform is caused to change into a waveform indicated by a dashed line shown therein. That is to say, since the charging current Ic from the constant circuit 2 increases according to the increase of the voltage of the input power source Vin as described above, the speed of charging the oscillator capacitor C1 increases. Consequently, the gradient of solid straight line $V_{C1}$ appearing during charge period $T_{1C}$ changes into the gradient of dashed straight line $V_{C2}$ appearing during charge period $T_{2C}$, thus meaning an increase in the gradient. Meanwhile, since the threshold voltages $V_{TH}$ and $V_{TL}$ which are generated on the basis of the input voltage V from the constant voltage circuit 1 are maintained substantially constant, charge time $T_{2C}$ after the increase of the voltage is decreased compared with charge time $T_{1C}$ before the increase of the voltage. And, since the processes of discharging the oscillator capacitor 1 during discharge periods $T_{1D}$ and $T_{2C}$ are identical with each other, the gradients of solid straight line $V_{D1}$ and dashed straight line $V_{D2}$ are almost identical with each other, and accordingly discharge periods $T_{1D}$ and $T_{2D}$ are also almost identical with each other. Consequently, cycle time T2 of the triangular waveform voltage after the increase of the voltage of the input power source Vin is decreased compared with cycle time T1 of the triangular waveform voltage before the increase of the voltage of the input power source Vin, thus a triangular waveform voltage with a higher frequency is outputted.

The triangular waveform voltage outputted from the triangular waveform oscillation circuit 3 is inputted to the non-inverting input terminal of the comparator COMP2 of the comparison circuit 4, and the threshold voltage $V_{th}$ resulting from the output voltage V of the constant voltage circuit 1 divided by the resistors R13 and R14 is inputted to the inverting input terminal of the comparator COMP2. Consequently, the rectangular waveform generated at the output terminal COMP2o of the comparator COMP2 is at the high level when the triangular waveform voltage is higher than the threshold voltage $V_{th}$, and is at the low level when the triangular waveform voltage is lower than the threshold voltage $V_{th}$, thus a rectangular waveform voltage is generated. In the present invention, the threshold voltage $V_{th}$ of the comparator COMP2 is set to stay substantially at the halfway level between the two threshold voltages $V_{TH}$ and $V_{TL}$ of the comparator COMP1, and the duty ratio of the rectangular waveform voltage outputted from the output terminal COMP2o of the comparator COMP2 is set about at 50% regardless of frequency.

Figure 4B:
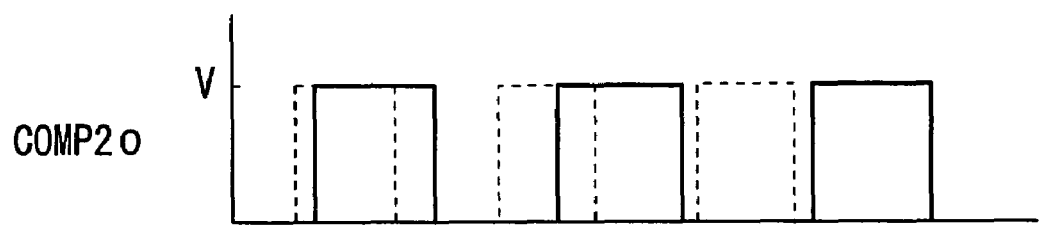
FIG. 4B is a timing chart for an operation sequence of a comparison circuit in the rare gas fluorescent lamp lighting apparatus of FIG. 1.

FIG. 4B shows rectangular waveform voltages which correspond respectively to the triangular waveform voltages indicated by solid and dashed lines, and which are transformed at the threshold voltage $V_{th}$. Since the rectangular waveform voltage has its frequency increased with its duty ratio kept substantially constant while the voltage of the input power source Vin increases, the time periods at the high level and the low level in one cycle time are shortened. As described above, the rectangular waveform voltage is adapted to drive, via the drive circuit 5, the switching element Q1 of the inverter circuit 6, for example, such that the rectangular waveform voltage is at the high level when the switching element Q1 is turned on. Consequently, it will be understood that the on-time of the on/off operation of the switching element Q1 is caused to decrease with an increase in the voltage of the input power source Vin.

The effect and advantage of the rare gas fluorescent lamp lighting apparatus 50 according to the present embodiment will be described with reference to FIGS. 5 to 17.

Figure 10:
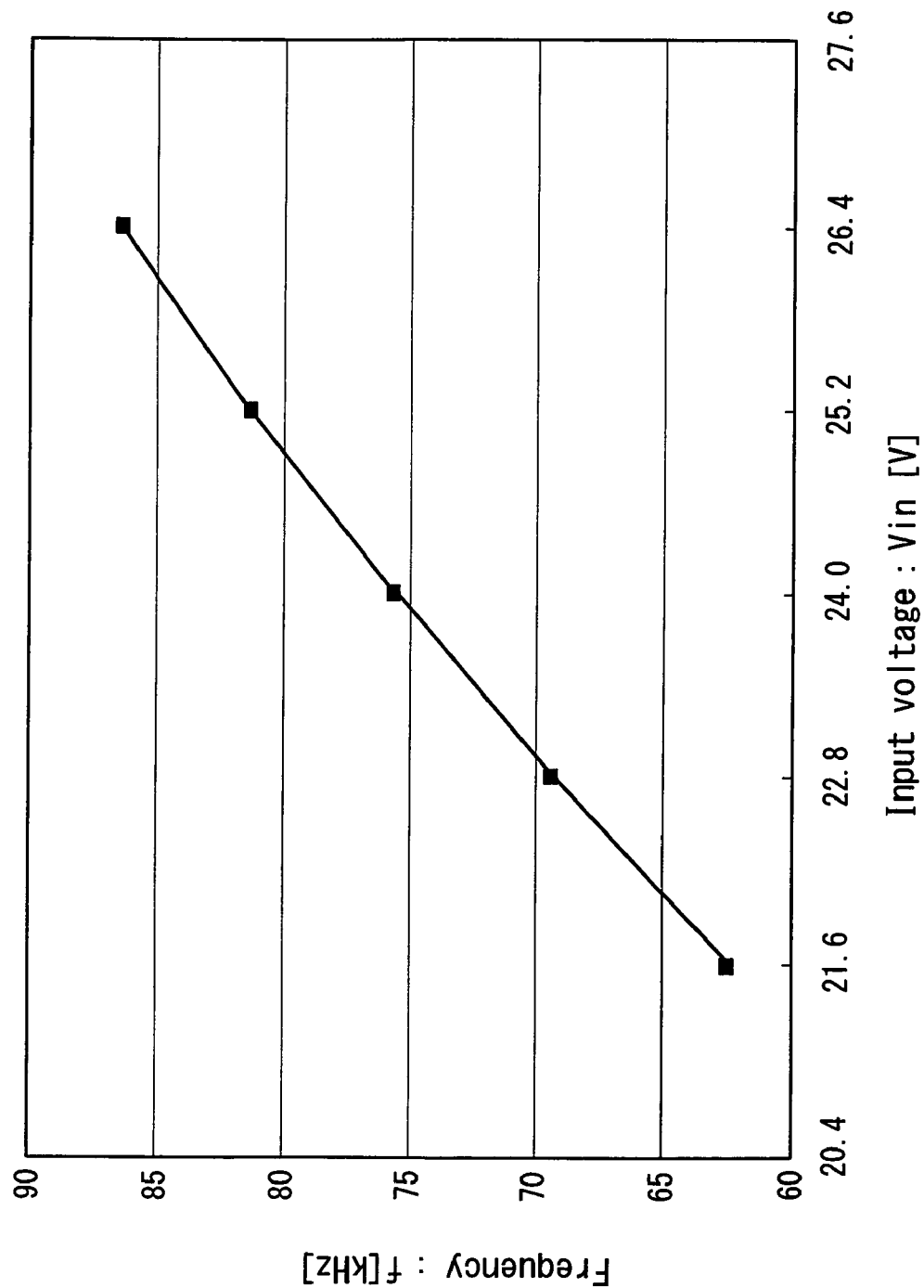
FIG. 10 is a graph showing a frequency as a function of a voltage at the input power source in the rare gas fluorescent lamp lighting apparatus of FIG. 1.

Referring first to FIGS. 5 to 9, it is understood that the frequency of the voltage at the inverting input terminal COMP(−) of the comparator COMP1, that is to say, the frequency of the driving signal Vgs is increased with an increase in the voltage of the input power source Vin, which is shown in FIG. 10.

Figure 16:
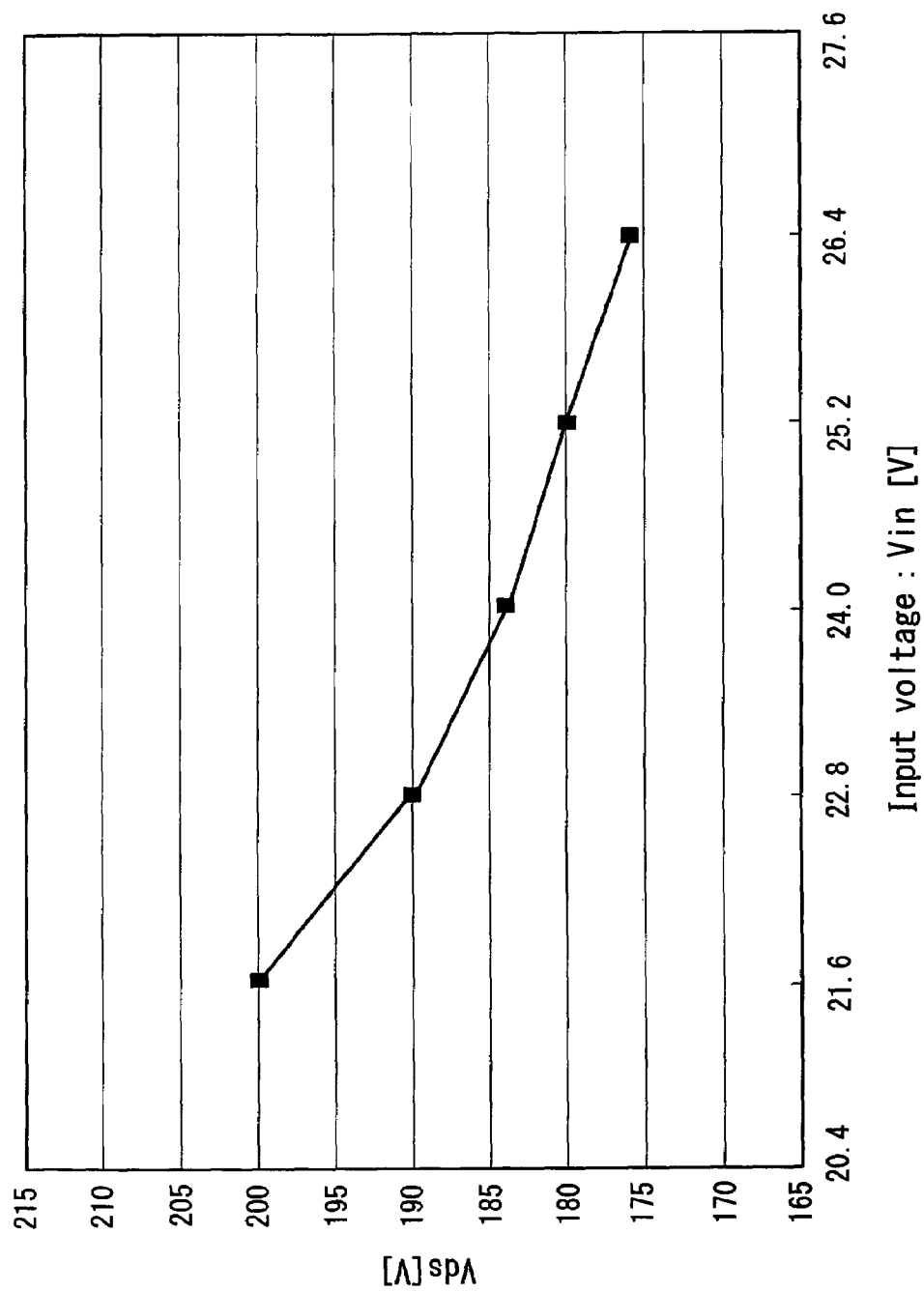
FIG. 16 is a graph showing a voltage generated at the primary side of the transformer as a function of an input voltage in the rare gas fluorescent lamp lighting apparatus of FIG. 1.
Figure 17:
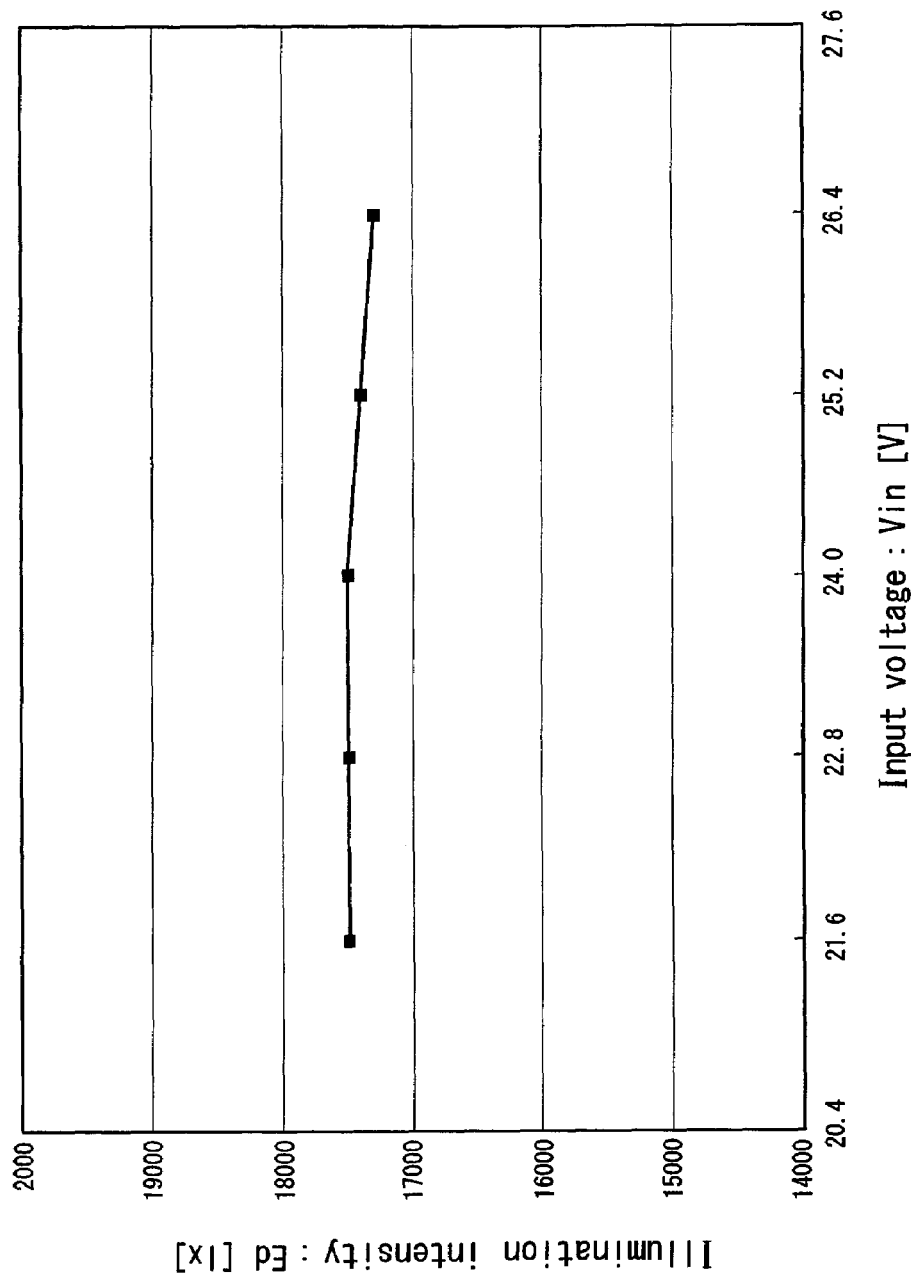
FIG. 17 is a graph showing an illumination intensity as a function of an input voltage in the rare gas fluorescent lamp lighting apparatus of FIG. 1.
Figure 18:
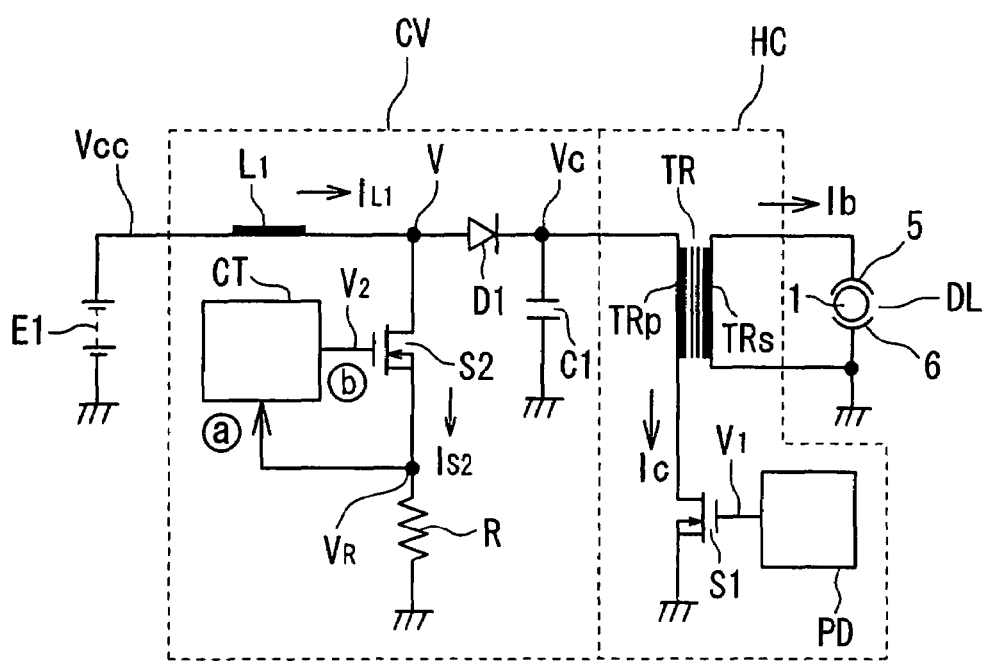
FIG. 18 is a block diagram of a conventional rare gas fluorescent lamp lighting apparatus.

Referring then to FIGS. 11 to 15, it is understood that the peak value of the current Id increasing during one on-operation of the switching element Q1, and the peak value of the pulse voltage Vds generated at the primary side TRp of the transformer TR at the off-time of the switching element Q1 are decreased with an increase in the voltage of the input power source Vin, which means that the energy stored in the transformer TR during one on-operation of the switching element Q1 is reduced. The above-described variation of the peak value of the voltage Vds corresponding to the variation of the voltage at the input power source Vin is shown in FIG. 16.

Thus, in the rare gas fluorescent lamp lighting apparatus 50 according to the present embodiment, the operating frequency of the switching element Q1 is varied with the duty ratio of the input power source Vin maintained substantially constant, whereby the energy stored at the transformer TR during one on-operation of the switching element Q1 is caused to vary so as to cancel out the variation of the voltage of the input power source Vin, and consequently the electric power applied to the transformer TR is maintained substantially constant. As a result, the light amount of the rare gas fluorescent lamp DL connected to the secondary side TRs of the transformer TR is maintained substantially constant, even if the voltage of the input power source Vin varies, which is evidenced by the graph of FIG. 17.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A rare gas fluorescent lamp lighting apparatus comprising:
   a transformer having a rare gas fluorescent lamp connected to a secondary side thereof;
   a switching element connected in series to a primary side of the transformer;
   an input power source applied to the primary side of the transformer; and
   a drive block to drive the switching element, the drive block comprising:
   a triangular waveform oscillation circuit to increase and decrease oscillation frequency according respectively to an increase and a decrease in a voltage of the input power source; and
   a comparison circuit to transform a triangular waveform outputted from the triangular waveform oscillation circuit into a rectangular waveform with a predetermined duty ratio, wherein a switching frequency of the switching element is varied according to the increase and the decrease of the voltage in the input power source.

2. A rare gas fluorescent lamp lighting apparatus according to claim 1, wherein the drive block further comprises: a constant voltage circuit to convert the voltage of the input power source into a constant voltage as an output; and a constant current circuit to output a charging current according to the voltage of the input power source, and wherein the triangular waveform oscillation circuit comprises: an oscillator capacitor to be charged by the charging current of the constant current circuit and to be discharged at a predetermined time constant; and a comparator which switches between a charging mode and a discharging mode for the oscillator capacitor, and to which a threshold voltage resulting from division of the constant voltage from the constant voltage circuit, and a terminal-based voltage across both terminals of the oscillator capacitor are inputted, whereby the terminal-based voltage is outputted as a triangular waveform voltage.

3. A rare gas fluorescent lamp lighting apparatus according to claim 1, wherein the rare gas fluorescent lamp lighting apparatus is used for a light source for illumination in a document reading device.

* * * * *